US006742699B2

(12) United States Patent
Saarinen et al.

(10) Patent No.: US 6,742,699 B2
(45) Date of Patent: Jun. 1, 2004

(54) METHOD FOR MANUFACTURING A COOLING ELEMENT AND A COOLING ELEMENT

(75) Inventors: Risto Saarinen, Espoo (FI); Yrjö Leppänen, Pori (FI)

(73) Assignee: Outokumpu Oyj, Espoo (FI)

( * ) Notice: Subject to any disclaimer, the term of this patent is extended or adjusted under 35 U.S.C. 154(b) by 0 days.

(21) Appl. No.: 10/221,989

(22) PCT Filed: Mar. 21, 2001

(86) PCT No.: PCT/FI01/00280

§ 371 (c)(1), (2), (4) Date: Sep. 18, 2002

(87) PCT Pub. No.: WO01/71267

PCT Pub. Date: Sep. 27, 2001

(65) Prior Publication Data

US 2003/0038164 A1 Feb. 27, 2003

(30) Foreign Application Priority Data

Mar. 21, 2000 (FI) ............................................ 20000658

(51) Int. Cl.[7] .......................... B23K 31/02; C21B 7/04; C21B 7/10; F27D 1/06; F27D 1/12

(52) U.S. Cl. .................... 228/122.1; 228/135; 228/246; 228/248.1; 266/193; 266/286; 373/74; 373/76

(58) Field of Search .......................... 228/122.1, 123.1, 228/124.1, 124.5, 124.6, 183, 245–262, 135; 266/193, 286; 373/74, 76

(56) References Cited

U.S. PATENT DOCUMENTS

| | | | | |
|---|---|---|---|---|
| 4,382,585 A | | 5/1983 | Fischer et al. | |
| 4,637,218 A | * | 1/1987 | Tchernev | 62/106 |
| 4,752,218 A | | 6/1988 | Nos et al. | |
| 4,892,293 A | | 1/1990 | Kato et al. | |
| 5,729,988 A | * | 3/1998 | Tchernev | 62/106 |
| 6,221,312 B1 | * | 4/2001 | Van Laar et al. | 266/193 |
| 6,404,799 B1 | * | 6/2002 | Mori et al. | 373/71 |
| 2003/0020212 A1 | * | 1/2003 | Heinrich et al. | |
| 2003/0038164 A1 | * | 2/2003 | Saarinen et al. | |

FOREIGN PATENT DOCUMENTS

| | | | |
|---|---|---|---|
| FI | WO 00/73514 A1 | * | 7/2000 |
| GB | 1389002 | * | 4/1975 |
| JP | 359185709 A | * | 10/1984 |
| JP | 404353391 A | * | 12/1992 |
| JP | 11189830 A | * | 7/1999 |

* cited by examiner

*Primary Examiner*—Kiley Stoner
(74) *Attorney, Agent, or Firm*—Morgan & Finnegan, LLP

(57) ABSTRACT

A method for manufacturing a cooling element comprising a housing part and ceramic lining elements arranged on the housing part surface. The ceramic lining elements (2) are connected to the element housing part (1) by using in the joint between the lining elements and the housing part a soldering/brazing agent, wherein at least the junction area is heated at least up to the melting temperature of the soldering/brazing agent, so that there is created a joint with a good thermal contact with the element housing part (1) and a ceramic lining element (2). The invention also relates to a cooling element.

10 Claims, 1 Drawing Sheet

METHOD FOR MANUFACTURING A COOLING ELEMENT AND A COOLING ELEMENT

Figure 1:
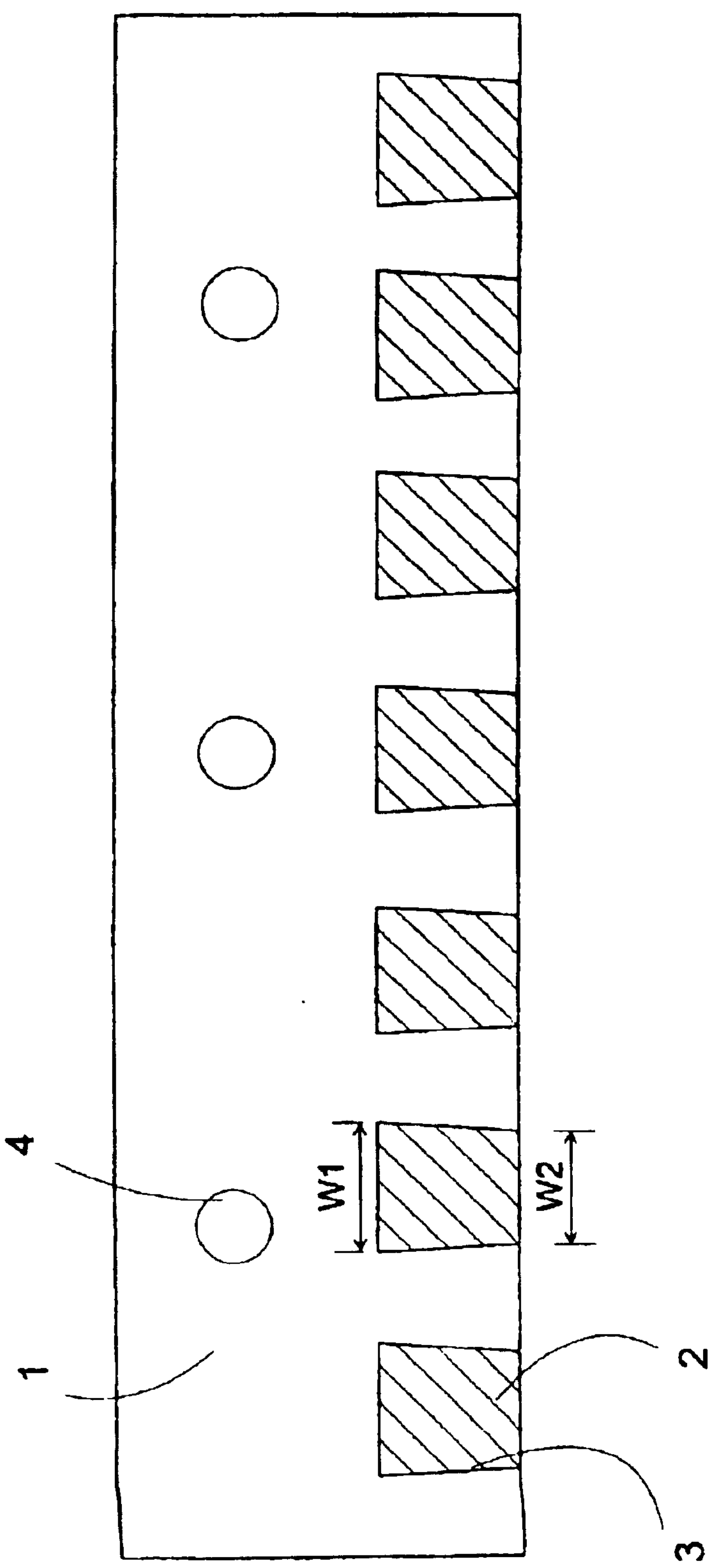

The present invention relates to a method for manufacturing a cooling element according to the preamble of the appended claim 1. The invention also relates to a cooling element.

In connection with industrial furnaces, such as flash smelting furnaces, blast furnaces and electric furnaces used in the manufacturing of metals, or in connection with other metallurgic reactors, there are used cooling elements that are typically made of mainly copper. On the surface of the cooling element, there is often arranged a ceramic lining, for instance made of fireproof bricks. The cooling elements are typically water-cooled and thus provided with a cooling water channel system, so that the heat is transferred from the fireproof bricks through the housing of the cooling element to the cooling water. The cooling elements are used in extreme working conditions, where they are subjected to strong corrosion and erosion strain caused by the furnace atmosphere or contacts with the molten material. For an effective operation of the cooling element, it is important that the joint between the fireproof bricks and the cooling element is good, in which case an effectively heat-transferring contact is achieved. A drawback in the manufacturing of known cooling elements is the complexity of the manufacturing methods in attaching the ceramic/fireproof lining and the difficulty in obtaining a good contact between the ceramic lining and the element. Thus the cooling properties of the element cannot be fully utilized. This in turn results in an accelerated wearing of the lining.

The object of the invention is to realize a method for manufacturing a cooling element, by which method the drawbacks of the prior art can be avoided. Another object of the invention is to realize a cooling element that has a good contact between the ceramic lining and the element housing.

The invention is characterized by what is specified in the appended claims.

The arrangement according to the invention has several remarkable advantages. According to the method, there is obtained an extremely good contact between the ceramic lining elements and the cooling element housing. This maintains the temperature on the furnace-side of the cooling element and its ceramic parts, such as the fireproof bricks, sufficiently low, so that on the element surface there is created a so-called autogenous lining, comprising among others oxidic and/or sulfidic molten components. Now the wearing of the bricks, among others, is essentially slowed down, and the working life of the cooling element is increased. The method according to the invention is advantageous also as regards the manufacturing technology.

The invention is explained in more detail below, with reference to the appended drawing, where FIG. 1 illustrates the cooling element according to the invention, seen in cross-section.

The cooling element according to the invention comprises a housing part 1, provided with a channel system 4 for the cooling water circulation, and a lining formed of ceramic elements 2 applied to at least part of the surface of the housing part. The elements 2 of the ceramic lining are attached to the housing part 1 by means of a soldering/brazing agent in a way that results in a good thermal contact between the ceramic part and the housing part. The housing part 1 of the cooling element is typically made of copper, for example. Advantageously the housing part 1 of the cooling element is made for instance by casting, such as by draw casting. The housing part is provided with a channel system 6 for the cooling water circulation. Typically the channel system 4 is made by working, for instance by drilling, or in connection with the casting. At least one of the surfaces of the housing part 1 is provided with grooves 3, where there are arranged elements 2 of the ceramic lining, typically fireproof bricks. In between the housing part 1 of the cooling element and the ceramic elements 2, there is made a joint enabling a good thermal contact by means of a soldering/brazing agent. The ceramic elements 2 are arranged to be held in the grooves in a shape-locking fashion, when the element is in a position where the groove opens downwardly. The grooves 3 can be for instance narrowing at the groove bottom towards the element surface, in which case the groove width $W_1$ at the groove bottom is larger than the groove width $W_2$ on the surface level. In a typical embodiment, the groove width $W_2$ on the housing part surface level is 2–10 mm narrower than the groove width $W_1$ at the groove bottom. The dimensional tolerance between the grooves 3 and the ceramic lining elements 2 is arranged to be such that the ceramic elements 2 can be inserted in the grooves 3 at the ends thereof, from the side of the element housing part. In between the ceramic elements 2 and the housing part 1, at least at the junction surfaces, there is applied an intermediate layer of the soldering/brazing agent, with a melting temperature that is lower than the melting temperature of the pieces to be joined. The soldering/brazing agent can be brought in the joint for instance in the form of foil or powder. The soldering/brazing agent can also be readily included in at least one of the parts to be joined. For instance, the elements of a ceramic lining can include a layer of soldering/brazing agent on the junction surface, in which case said elements are immersed in the molten soldering/brazing agent prior to installing them in the grooves of the housing part. In that case a soldering/brazing agent layer is absorbed in the surface of the ceramic lining element. The soldering/brazing agent can be for example a copper-based alloy with a melting temperature within the range of 400–7000° C.

When the ceramic lining elements 2, for instance fireproof bricks, and the soldering/brazing agent are arranged in the groove, the junction area of at least the pieces to be joined together is heated up to a temperature where the soldering/brazing agent melts and makes a good thermal contact between the bricks and the housing part. It is also possible to bring more soldering/brazing agent to the junction area during the heating process. The heating can be carried out in the same step where a possible blocking joint of the cooling channel is made.

The cooling elements according to the invention can be used in several different applications. A typical target for the use of the cooling element according to the invention is for instance the ceiling of the lower furnace in a flash smelting furnace. There the shape of the grooves made in the cooling element prevents the ceramic lining elements from falling off the grooves, although the element is installed so that the lining side is directed downwards. The grooves do not have to be narrowed very much, because the temperature of the elements on the furnace side is higher than the temperature on the side that is directed away from the furnace, in which case thermal expansion causes pressure tension on the surface that is located on the furnace side. Typical measures for a cooling element according to the invention are: width: 0.25–1 m, length 1–2 m, and thickness of the housing part 100–200 mm, of which the thickness of the grooved part constitutes roughly a half.

What is claimed is:

1. A method for manufacturing a cooling element comprising a housing part and ceramic lining elements arranged on the housing part surface, the method comprising connecting the ceramic lining elements to the element housing part, mainly made of copper, by using in the joint between the lining elements and the housing part a soldering agent, heating at least the junction area at least up to the melting temperature of the soldering agent, so that there is created a joint with a good thermal contact with the element housing part and a ceramic lining element and providing the surface of the cooling element housing part with grooves, in which the ceramic lining elements are fitted.

2. A method according to claim 1, wherein the ceramic lining elements are fireproof bricks.

3. A method according to claim 1, wherein the soldering agent is brought separately to the junction area.

4. A method according to claim 1, wherein the soldering agent is brought to the junction area together with the pieces to be joined together.

5. A method according to claim 1, further comprising applying in the ceramic lining elements, at least on the junction surface thereof, at least one intermediate agent layer, prior to bringing the elements to the junction area.

6. A cooling element comprising a housing part provided with a channel system for the cooling water circulation, and a lining made of ceramic elements in at least part of the housing part surface, comprising the ceramic lining elements being connected to the housing part, mainly made of copper, by means of a soldering agent having a melting temperature between 400° C. and 700° C. in a way that results in a good thermal contact between the ceramic element and the housing part, the surface of the cooling element housing part having grooves therein, in which the ceramic lining elements are arranged to be fitted.

7. A cooling element according to claim 6, wherein the ceramic lining elements are arranged to be kept in the grooves in a shape-locked fashion, when the element is in a position where the groove opens downwardly.

8. A cooling element according to claim 6, wherein the distance between the opposite walls of the housing part grooves is reduced while proceeding from the bottom of the grooves towards the housing part surface.

9. A method according to claim 2, wherein the soldering agent is brought separately to the junction area as a powder or a foil.

10. A method according to claim 5, wherein the intermediate agent layer is a metal layer or a soldering agent layer.

* * * * *